US012636688B2

(12) United States Patent
Luo et al.

(10) Patent No.:     US 12,636,688 B2
(45) Date of Patent:     May 26, 2026

(54) VEHICLE-MOUNTED IN-SITU MAGNETIC FIELD DECONTAMINATION DEVICE FOR HEAVY METAL CONTAMINATED SOIL WITH RETRACTABLE BAFFLE

(71) Applicant: INSTITUTE OF SOIL SCIENCE, CAS, Nanjing (CN)

(72) Inventors: Yongming Luo, Nanjing (CN); Guoming Liu, Nanjing (CN); Chen Tu, Nanjing (CN)

(73) Assignee: INSTITUTE OF SOIL SCIENCE, CAS, Nanjing (CN)

( * ) Notice: Subject to any disclaimer, the term of this patent is extended or adjusted under 35 U.S.C. 154(b) by 418 days.

(21) Appl. No.: 18/347,678

(22) Filed: Jul. 6, 2023

(65) Prior Publication Data

US 2024/0009721 A1     Jan. 11, 2024

(30) Foreign Application Priority Data

Jul. 6, 2022   (CN) .......................... 202210799648.4

(51) Int. Cl.
*B03C 1/02*           (2006.01)
*A01B 49/04*          (2006.01)
(Continued)

(52) U.S. Cl.
CPC ................ *B09C 1/00* (2013.01); *A01B 49/04* (2013.01); *B03C 1/01* (2013.01); *B03C 1/029* (2013.01);
(Continued)

(58) Field of Classification Search
None
See application file for complete search history.

(56) References Cited

U.S. PATENT DOCUMENTS 4,969,775 A * 11/1990 Cappel ...................... B09C 1/02
                                                210/768
5,188,135 A *  2/1993 Neumann ................ C23G 3/00
                                                134/122 R
(Continued)

FOREIGN PATENT DOCUMENTS

CN        103962370 A  *  8/2014
CN        203830397 U  *  9/2014
(Continued)

*Primary Examiner* — Edwin J Toledo-Duran
(74) *Attorney, Agent, or Firm* — SALIWANCHIK, LLOYD & EISENSCHENK

(57)            ABSTRACT
A vehicle-mounted in-situ magnetic field decontamination device for heavy metal contaminated soil with a retractable baffle is provided and includes a mounting frame, a plurality of magnetic rods circumferentially move along the mounting frame, the mounting frame and a lifting regulator are hinged with an agricultural machinery frame body, and an upper end of the mounting frame is supported by the lifting regulator. A magnetic particle recovery assembly is arranged below the upper end of the mounting frame. A retractable baffle assembly includes baffle springs and non-magnetic baffles, which each sleeve a corresponding magnetic rod. A turn-over channel for the retractable baffle assembly to move is provided at a middle part of mounting frame. Compression flaps are provided at both sides of turn-over channel, and an ejection flare for the ejection of the non-magnetic baffles is formed between free ends of the compression flaps at both sides.

10 Claims, 8 Drawing Sheets

(51) Int. Cl.

| | | |
|---|---|---|
| *B03C 1/01* | (2006.01) | |
| *B03C 1/029* | (2006.01) | |
| *B03C 1/033* | (2006.01) | |
| *B08B 3/04* | (2006.01) | |
| *B09C 1/00* | (2006.01) | |
| *F26B 9/06* | (2006.01) | |
| *F26B 21/00* | (2006.01) | |

(52) U.S. Cl.

CPC .............. *B03C 1/0332* (2013.01); *B08B 3/04* (2013.01); *F26B 9/066* (2013.01); *F26B 21/001* (2013.01); *F26B 21/003* (2013.01); *B03C 2201/20* (2013.01); *B03C 2201/30* (2013.01); *B09C 2101/00* (2013.01)

(56) References Cited

U.S. PATENT DOCUMENTS

| | | | | |
|---|---|---|---|---|
| 5,193,935 A * | 3/1993 | Musil | .................... | F26B 25/007 |
| | | | | 405/131 |
| 5,517,929 A * | 5/1996 | Repnik | .................... | B09C 1/06 |
| | | | | 110/190 |
| 5,772,776 A * | 6/1998 | Holbein | .................... | C02F 9/00 |
| | | | | 134/13 |
| 5,837,325 A * | 11/1998 | Heacock | .................... | B09C 1/08 |
| | | | | 241/43 |
| 5,988,947 A * | 11/1999 | Bruso | .................... | B09C 1/08 |
| | | | | 405/128.85 |
| 6,049,021 A * | 4/2000 | Getman | .................... | G21F 9/001 |
| | | | | 588/314 |

| | | | | |
|---|---|---|---|---|
| 7,725,976 B1 * | 6/2010 | Crank | .................... | B08B 17/00 |
| | | | | 15/302 |
| 2002/0000485 A1 * | 1/2002 | Rowley, Jr. | .......... | F26B 17/107 |
| | | | | 241/39 |
| 2003/0080224 A1 * | 5/2003 | Rowley, Jr. | ............ | F26B 17/10 |
| | | | | 241/39 |
| 2003/0226788 A1 * | 12/2003 | Bergeron | ................. | B09C 1/00 |
| | | | | 209/164 |
| 2006/0140725 A1 * | 6/2006 | Benjamin | ................. | B09C 1/02 |
| | | | | 405/128.7 |
| 2006/0228231 A1 * | 10/2006 | Winzeler | ............... | B01D 3/101 |
| | | | | 417/313 |
| 2011/0031166 A1 * | 2/2011 | Graham | ................. | B08B 15/02 |
| | | | | 209/19 |
| 2012/0263538 A1 * | 10/2012 | Hanasaka | ............. | H05B 6/107 |
| | | | | 405/128.85 |

FOREIGN PATENT DOCUMENTS

| | | | | | | |
|---|---|---|---|---|---|---|
| CN | 108014914 A | * | 5/2018 | ............. | B03C 1/02 |
| CN | 110153164 A | * | 8/2019 | ............ | A01B 77/00 |
| CN | 111905923 A | * | 11/2020 | ............ | B08B 13/00 |
| CN | 111940132 A | * | 11/2020 | ............ | B09C 1/00 |
| DE | 3815461 A1 | * | 5/1989 | ............ | B03D 1/02 |
| DE | 4217703 A1 | * | 12/1993 | ............ | B09C 1/02 |
| DE | 19546829 A1 | * | 6/1997 | ............ | F41H 11/26 |
| DE | 19711544 A1 | * | 9/1998 | ............ | F41H 11/20 |
| EP | 0013997 A1 | * | 8/1980 | ............ | B03C 1/30 |
| JP | 2016172232 A | * | 9/2016 | | |
| KR | 100807772 B1 | * | 2/2008 | ............ | A62D 3/40 |
| KR | 20100034814 A | * | 4/2010 | ............ | A01B 49/02 |

* cited by examiner

VEHICLE-MOUNTED IN-SITU MAGNETIC FIELD DECONTAMINATION DEVICE FOR HEAVY METAL CONTAMINATED SOIL WITH RETRACTABLE BAFFLE

CROSS-REFERENCE TO RELATED APPLICATION

This patent application claims the benefit of Chinese Patent Application No. 202210799648.4, filed on Jul. 6, 2022, the disclosure of which is incorporated by reference herein in its entirety.

TECHNICAL FIELD

The present disclosure relates to the field of the remediation of heavy metals contaminated soils, in particular to a vehicle-mounted in-situ magnetic field decontamination device for heavy metal contaminated soil with a retractable baffle.

BACKGROUND

Heavy metal pollution in soils will affect the quality and safety of agricultural products, human settlements and ecological environment. With the development of science and technology, a method for enriching and recovering heavy metals in soil by using magnetic materials to achieve heavy metal removal in the prior art has the advantages of high adsorption efficiency, short repair period, and the like. For example, a parallel remediation method for a heavy metal contaminated farmland is disclosed in the Chinese invention patent with authorized number No. CN111589851B. By embedding remediation rods in the soil and doping heavy metal capturing agent and remediation microspheres, in which the heavy metal capturing agent is used to capture heavy metal ions in soil by water penetration to form insoluble substances, while the remediation microspheres are used to adsorb and capture the heavy metal insoluble substances by magnetism while continuously peeling off surface nutrients, and finally the residual remediation microspheres and heavy metals are recovered by a magnetic field. The remediation rod mainly controls the changes of liquid and solid properties of a magnetorheological fluid through electromagnets. The surface aperture of the remediation rod is controlled to limit the passage of the remediation microspheres, so as to recover the microspheres. The remediation rod includes a magnetorheological fluid, an electromagnet, an elastic liquid capsule, a trimming fiber bundle, a dual-state variable diameter retaining pin, and other structures.

However, due to the diversity of soil media, it is difficult to separate magnetic materials from soil during recovery. In the prior art, there are few agricultural machinery and equipment for magnetic material recovery. In Chinese invention patent No. CN109622582A, a vehicle-mounted in-situ remediation equipment for heavy metal contaminated farmland soil is disclosed. Firstly, a push bucket is used to take a soil solution during moving forwards. The soil solution, after being stirred by a variable diameter agitator and filtered by a filter screen, is lifted by a pipeline pump to a primary magnetic recovery machine for multiple magnetic separation, so that heavy metal chelating agent in the soil solution are adsorbed on a magnetic drum, and then hung on a concentrate tank for recovery by a scraper device. Meanwhile, the device is also provided with a secondary magnetic recovery machine to increase the magnetic separation area. However, the structure of the device is complicated and the energy consumption is high, due to the fact that a large amount of soil solution has to be lifted to the required height of the device. In Chinese invention patent No. CN213350172U, an in-situ recovery device for soil heavy metal ions adsorbent is disclosed. A crawler is a magnetic crawler, which is used to absorb the magnetic heavy metal ion adsorbent in the soil during the traveling process, likewise, the magnetic heavy metal ion adsorbent on the crawler is scrapped off by a scraper and then recovered. However, the crawler needs to bear the gravity of the whole equipment during the traveling process, which is easy to cause soil compaction and magnetic particle burial, and the adsorbed magnetic material is directly scraped off and recovered on a horizontal crawler, which is easy to be mixed with soil particles or other impurities.

In addition, the following treatment needs to be considered when the magnetic material in the soil is separated. In Chinese invention patent No. CN106076616B, a rotating magnetic rod combined type soil enrichment and decontamination in-situ recovery device is disclosed. A rotating magnetic rod group is arranged below a lifting device, and the outside of the rotating magnetic rod group is sleeved with a stainless-steel sleeve. Meanwhile, the device is also provided with an aeration stirring device. When the device is working, an air compressor in an aeration stirring device is started to input compressed air into a stirring pipe, and the compressed air escapes from air holes on the stirring pipe to generate bubbles in the mud, and the mud is stirred to inhibit a magnetic material from precipitating; and then rotating magnetic rod group rotates to adsorb the magnetic material. The device is also complicated in structure and high in energy consumption. When the adsorbed magnetic material reaches a certain amount, the device needs to run to a separate unloading area to remove the rotating magnetic rod sleeve for unloading, and the magnetic material cannot be recycled in real time.

SUMMARY

An objective of the present disclosure is to provide a vehicle-mounted in-situ magnetic field decontamination device for heavy metal contaminated soil with a retractable baffle. In accordance with the present disclosure, the rotation of magnetic rods is used to achieve continuous extraction of magnetic particles, and baffle springs and compression flaps are used cooperatively to achieve the extension and retraction of non-magnetic baffles and then to achieve the recovery of magnetic particles. The energy consumption of the device is reduced while the structure is simplified, and the requirements of continuous operation in the farmland are satisfied.

The objective of the present disclosure is achieved through the following technical solution:

A vehicle-mounted in-situ magnetic field decontamination device for heavy metal contaminated soil with a retractable baffle includes a magnetic particle extraction mechanism, a magnetic particle recovery assembly, a lifting regulator, and an agricultural machinery frame body. The magnetic particle extraction mechanism includes a mounting frame, magnetic rods, and a retractable baffle assembly. The mounting frame is in the shape of a closed loop, and the multiple magnetic rods move circumferentially along the closed loop of the mounting frame. A lower end of the mounting frame and a lower end of the lifting regulator are all hinged with the agricultural machinery frame body, and an upper end of the mounting frame is supported by the lifting regulator. The magnetic particle recovery assembly is arranged on the agricultural machinery frame body and below the upper end of the mounting frame. The retractable baffle assembly includes baffle springs and non-magnetic baffles arranged at free ends of the baffle springs, and both the non-magnetic baffles and the baffle springs each sleeve a corresponding one of the magnetic rods. The mounting frame is provided at a middle part thereof with a turn-over channel for the retractable baffle assembly to move, the turn-over channel are provided at both sides thereof with compression flaps, and the compression flaps are arranged at a lower side of the upper end of the mounting frame. An ejection flare for allowing the complete ejection of the non-magnetic baffles is formed between tilted free ends of the compression flaps on both sides. Each non-magnetic baffles abut against the respective compression flaps after fully extending out, and are compressed to retreat by the compression flaps along with the movement of the magnetic rods.

Two limit flaps are arranged at the middle part of the mounting frame, and the turn-over channel is formed between the two limit flaps. The non-magnetic baffles are provided with baffle sliding shafts, and after the non-magnetic baffles enter the ejection flare and are ejected out, the baffle sliding shafts abut against the corresponding compression flaps. When the non-magnetic baffles enter the turn-over channel, the baffle sliding shafts abut against the corresponding limit flaps.

A rotatable chain is arranged at the middle part of the mounting frame, and the magnetic rods are arranged separately on both sides of the chain in a cantilever shape.

A chain actuator is arranged on the mounting frame, a driving sprocket is arranged at a middle part of the lower end of the mounting frame, and a driven sprocket is arranged at a middle part of the upper end of the mounting frame. One end of the chain bypasses the driving sprocket, and the other end of the chain bypasses the driven sprocket. The driving sprocket is driven by the chain actuator to rotate.

The magnetic particle recovery assembly includes a recovery box body, liquid pumps, a dry storage box, and a box body rotation mechanism. The recovery box body is provided with multiple cavities, each cavity is provided with a liquid pump and a magnetic particle recovery inductor, each cavity is provided at a lower side thereof with a discharge port, the dry storage box is arranged at one side of the recovery box body, and the recovery box body is driven by the box body rotation mechanism to enable the discharge port of each cavity to align with an input end of the dry storage box. The discharge port is provided with a discharge control valve, the liquid pump is provided with a pipe a, a pipe b and a pipe c, and the pipe c extends into a next adjacent cavity in a rotating direction.

The box body rotation mechanism includes a rotation actuator, a rotation driving gear, and a ring gear. A lower end of the recovery box body is rotationally mounted to the agricultural machinery frame body, the ring gear is arranged at the lower end of the recovery box body. The rotation actuator is fixed to the agricultural machinery frame body and arranged at a lower side of the recovery box body, and the rotation actuator is provided on an output shaft thereof with a rotation driving gear meshing with the ring gear.

A dry filter screen, a fan and electric heating wires are arranged in the drying storage box. The fan and the electric heating wires are arranged at a lower side of the dry filter screen, an opening is formed at one side of a lower end of the dry storage box, and the fan is arranged at the opening. The lower end of each cavity of the recovery box body is provided with an inclined filter screen, and a mesh diameter of the filter screen is smaller than the diameter of the magnetic particles. A port of the pipe a of the liquid pump is arranged below the filter screen, and a port of the pipe b and a port of the pipe c are arranged above the filter screen.

After entering the magnetic particle recovery assembly, the magnetic particles fall into a cavity A filled with an eluent. After the cavity A is filled, the recovery box body is rotated to turn the next cavity B filled with the eluent to a position below the mounting frame to load the magnetic particles. Meanwhile, the discharge port at the lower end of the cavity A is aligned with the dry storage box for an elution operation. During elution, the discharge port of the cavity A is closed, the eluent enters from the pipe a of the liquid pump in the cavity A and is discharged through the pipe b. After completing the elution and regeneration, the pipe c of the liquid pump in the cavity A is opened, and the pipe b is closed, the eluent in the cavity A is pumped into the next cavity which is adjacent to the cavity A in a rotating direction and has no eluent through the pipe c. After the eluent completely flows out, the pipe c is closed, and the discharge port at the lower end of the cavity A is opened to output the magnetic particles.

The agricultural machinery frame body includes a front frame body and a rear frame body. A magnetic particle spreading means and a rotary tiller are provided on the front frame body, and the magnetic particle extraction mechanism and the magnetic particle recovery assembly are arranged on the rear frame body.

The front frame body is provided at a front end thereof with a front wheel, a rear end of the front frame body is detachably connected to a front end of the rear frame body, the rear frame body is provided at a rear end thereof with a rear wheel, and a control system is provided on the front frame body.

The present disclosure has the advantages and beneficial effects as follows.

1. According to the present disclosure, a chain is used to drive magnetic rods to circularly rotate and continuously enter soil muddy water to achieve the extraction of magnetic particles, thus the requirements of continuous operation in the farmland can be satisfied, and the recovery efficiency is improved. Moreover, during the ascending of the magnetic particles, the moisture on the magnetic particles and impurities that are not adsorbed can automatically fall down and be removed under the action of gravity. Therefore, it is unnecessary to provide structures such as a variable diameter stirrer and a filter screen for filtering, the structure is greatly simplified, and the energy consumption is reduced.

2. According to the present disclosure, the retractable baffle assembly utilizes the cooperation of baffle springs and compression flaps to achieve the expansion and retraction of non-magnetic baffles, so as to realize the recovery of magnetic particles, which is simple in structure and reliable in performance, and can also cooperate with a cyclic rotation operation of the magnetic rod.

3. The magnetic particle recovery assembly can achieve real-time recovery, elution and dry storage of the magnetic particles, and inhibit the remediated soil from secondary commination. Due to the fact that an eluent is recycled in different cavities of the recovery box body, it is unnecessary to supplement the eluent for a long time, and the farmland use requirements are satisfied.

4. According to actual need, a front frame body and a rear frame body of the agricultural machinery frame body can be split for use, or combined for use, which makes the use more convenient.

Figure 1:
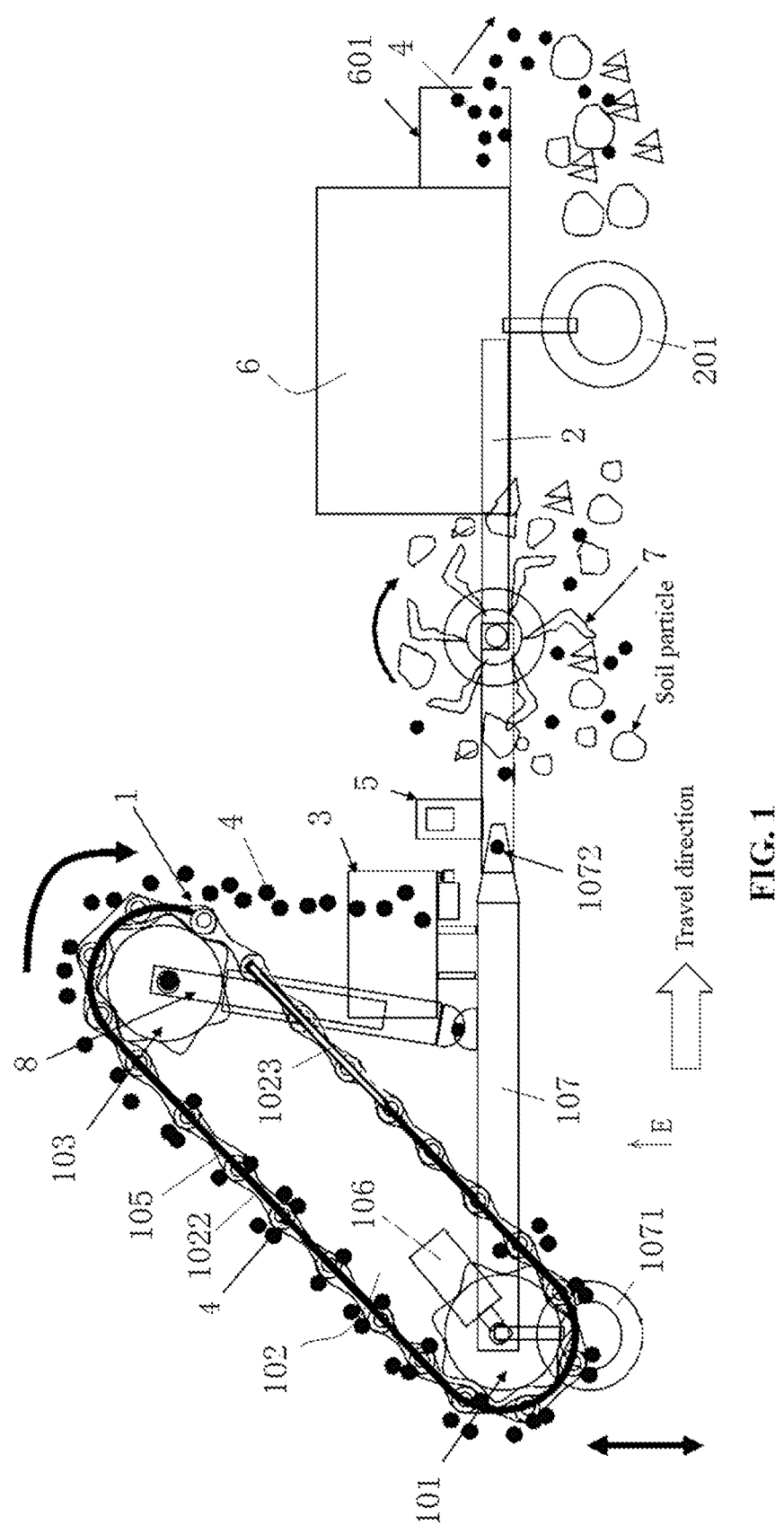
FIG. 1 is a structural schematic diagram of the present disclosure.

In the drawings: 1—magnetic particle extraction mechanism; 101—driving sprocket; 102—mounting frame; 1021—turn-over channel; 1022—limit flap; 1023—compression flap; 1024—ejection flare; 103—driven sprocket; 104—magnetic rod; 105—chain; 106—chain actuator; 107—rear frame body; 1071—rear wheel; 1072—connecting bolt; 108—retractable baffle assembly; 1081—non-magnetic baffle; 1082—baffle spring; 1083—baffle sliding shaft; 2—front frame body; 201—front wheel; 3—magnetic particle recovery assembly; 301—recovery box body; 302—rotation actuator; 303—rotation driving gear; 304—ring gear; 305—rotating shaft; 306—filter screen; 307—magnetic particle recovery inductor; 308—discharge port; 3081—discharge control valve; 309—dry storage box; 3091—fan; 3092—electric heating wire; 3093—dry filter screen; 310—partition plate; 311—liquid pump; 3111—driving motor; 3112—pump body; 3113—on-off control valve; 312—recovery hopper; 4—magnetic particle; 5—control system; 6—magnetic particle spreading means; 601—magnetic particle spreading outlet; 7—rotary tiller; 8—lifting regulator.

DETAILED DESCRIPTION OF THE EMBODIMENTS

The present disclosure is further described below with reference to the accompanying drawings.

As shown in FIGS. 1 to 11, a device provided by the present disclosure includes a magnetic particle extraction mechanism 1, a magnetic particle recovery assembly 3, a lifting regulator 8, and an agricultural machinery frame body. The magnetic particle extraction mechanism 1 includes a mounting frame 102, magnetic rods 104, and a retractable baffle assembly 108. The mounting frame 102 is in the shape of a closed loop, and multiple magnetic rods 104 move circumferentially along the closed loop of the mounting frame 102. A lower end of the mounting frame 102 and a lower end of the lifting regulator 8 are all hinged with the agricultural machinery frame body, and an upper end of the mounting frame 102 is supported by the lifting regulator 8. The lifting regulator 8 is used to drive the mounting frame 102 to rotate, so as to adjust a depth of the lower end of the mounting frame immersed in flooded soil mud water. The magnetic particle recovery assembly 3 is arranged on the agricultural machinery frame body and below the upper end of the mounting frame 102. In this embodiment, the mounting frame 102 is provided with a hinge seat, and a driving shaft of the lifting regulator 8 is hinged with the hinge seat. The lifting regulator 8 may be linear output devices such as an air cylinder, and an electric push rod.

Figure 2:
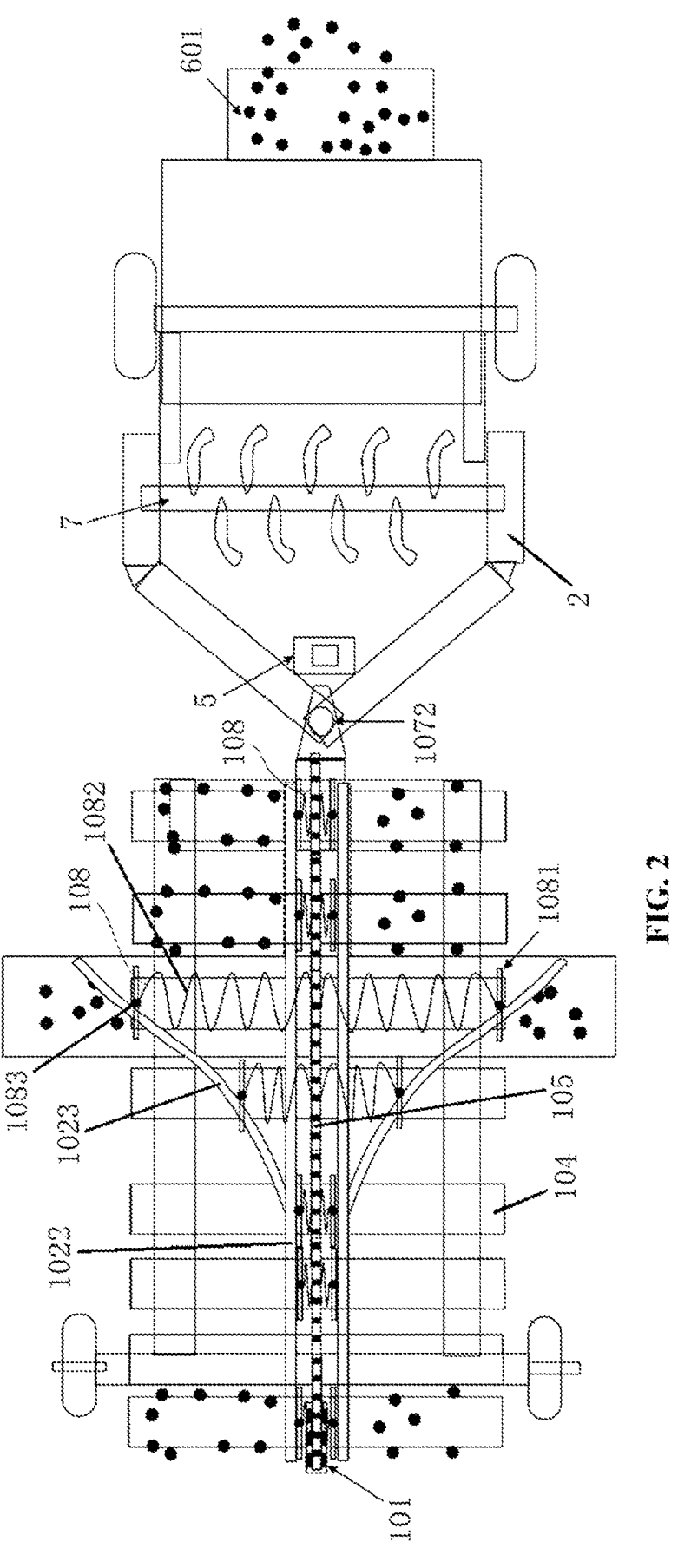
FIG. 2 is an E-direction view of FIG. 1.
Figure 3:
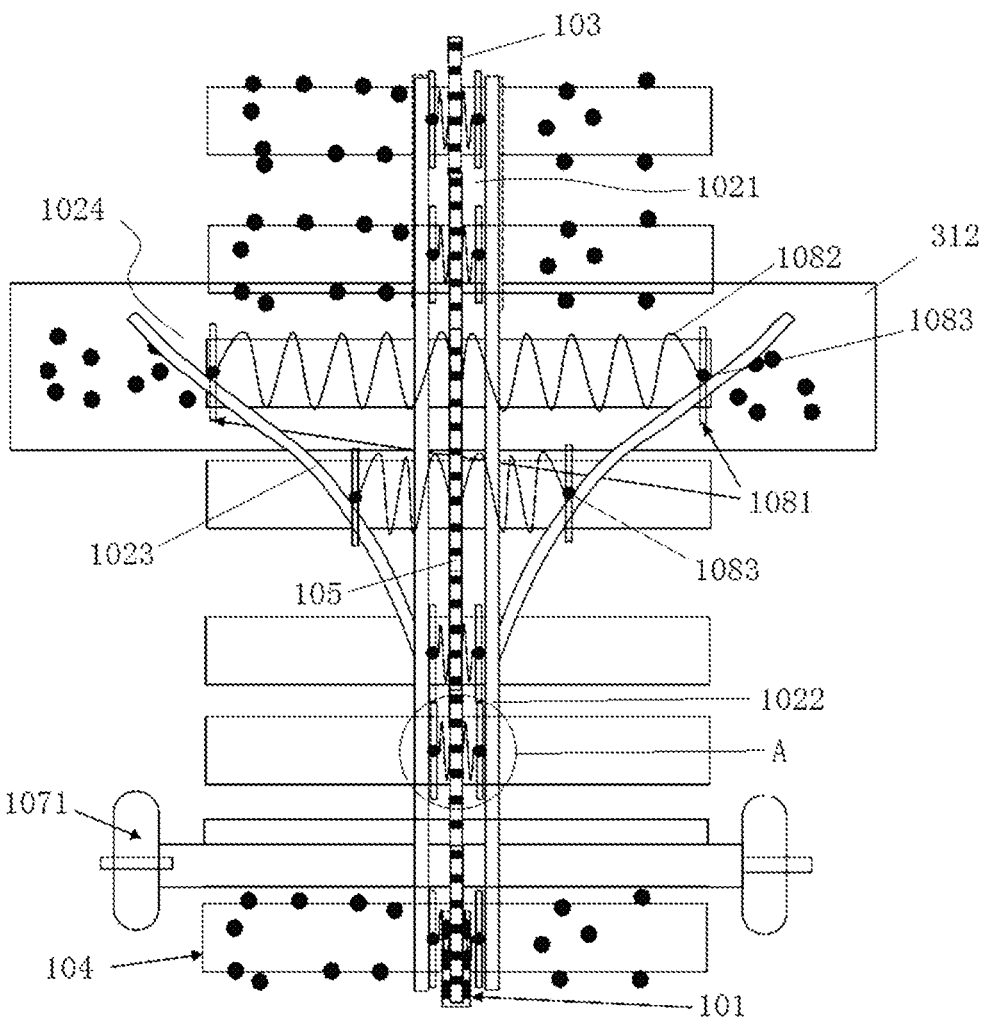
FIG. 3 is an enlarged view of a magnetic particle extraction mechanism in FIG. 2.
Figure 4:
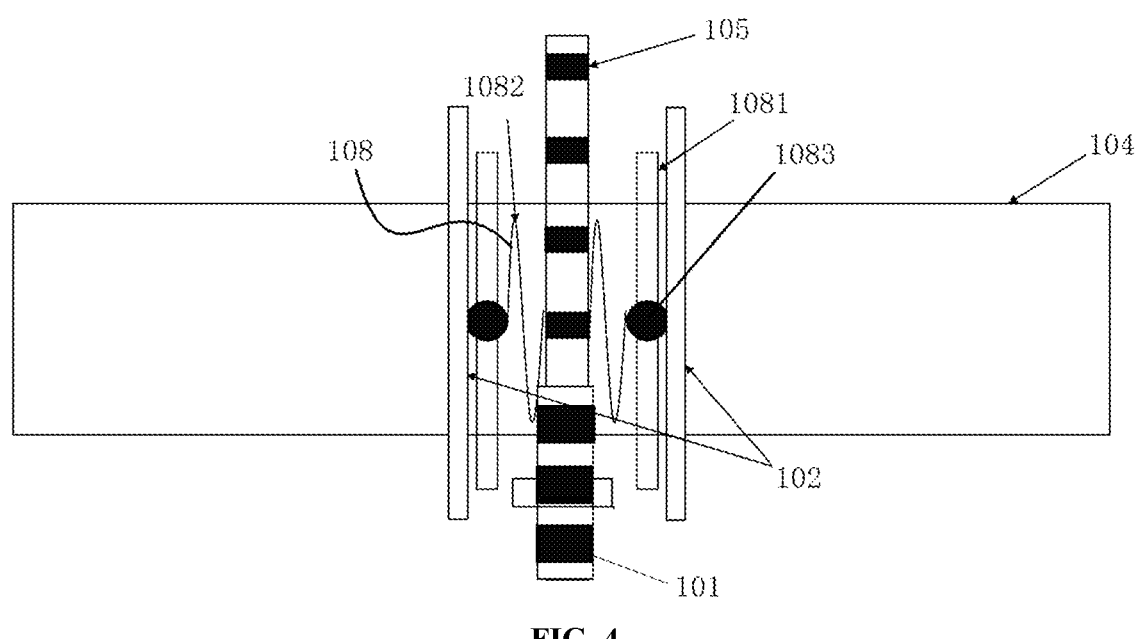
FIG. 4 is an enlarged view of A in FIG. 3.

As shown in FIGS. 2 to 4, the magnetic rods 104 are provided at middle parts thereof with the retractable baffle assembly 108. The retractable baffle assembly 108 includes baffle springs 1082 and non-magnetic baffles 1081 arranged at free ends of the baffle springs 1082, and the non-magnetic baffles 1081 and the baffle springs 1082 each sleeve a corresponding magnetic rod 104. The baffle springs 1082 are used to drive the non-magnetic baffles 1081 to move outwards. Two limit flaps 1022 are arranged at the middle part of the mounting frame 102, and a turn-over channel 1021 is formed between the two limit flaps 1022. The retractable baffle assembly 108 is arranged in the turn-over channel 1021, and the magnetic rod 104 drives the retractable baffle assembly 108 to move in the turn-over channel 1021 while rotating circumferentially along the closed loop of the mounting frame 102. As shown in FIG. 3, each limit flap 1022 is provided with an outward tilted compression flap 1023, and as shown in FIG. 1, the compression flap 1023 is arranged at a lower side of the upper end of the mounting frame 102, and a portion, corresponding to the compression flap 1023, of the limit flap 1022 is provided with an opening for the non-magnetic baffles 1081 and the baffle springs 1082 to pass through, and an ejection flare 1024 for the complete ejection of the non-magnetic baffles 1081 is formed between free ends of the compression flaps 1023 on both sides. The non-magnetic baffles 1081 abut against the compression flaps 1023 after fully extending out, and are gradually compressed by the compression flaps 1023 with the movement process of the magnetic rods 104 till to re-enter the turn-over channel 1021.

As shown in FIG. 3, the non-magnetic baffles 1081 are provided with baffle sliding shafts 1083 made of a non-magnetic material. After the non-magnetic baffles 1081 enter the ejection flare 1024 and are ejected out, the baffle sliding shafts 1083 abut against the compression flaps 1023 on the corresponding side. With the movement of the magnetic rods 104, the non-magnetic baffles 1081 are compressed by the compression flaps 1023 to retreat till to re-enter the turn-over channel 1021. During the compression of the non-magnetic baffles 1081, the baffle sliding shafts 1083 move along the compression flaps 1023 on the corresponding side, while a body part of the non-magnetic baffle 1081 is exposed to move between the compression flaps 1023 on both sides. As shown in FIG. 4, after the non-magnetic baffles 1081 re-enter the turn-over channel 1021, the baffle sliding shafts 1083 abut against the limit flaps 1022 on the corresponding side, so as to ensure the smooth movement of the retractable baffle assembly 108 in the turn-over channel 1021. In addition, as shown in FIG. 3, a joint of the compression flap 1023 and the limit flap 1022 on the corresponding side is provided with an opening with sufficient size to ensure that the non-magnetic baffles 1081 can pass through and enter the turn-over channel 1021 without obstruction, and the compression baffles 1023 are smoothly connected to the limit flaps 1022 on the corresponding side to ensure that the baffle sliding shafts 1083 can smoothly slide from the compression flaps 1023 to the limit flaps 1022. In this embodiment, balls can be arranged on the baffle sliding shafts 1083 to make contact with the flaps, so as to ensure smooth sliding.

As shown in FIGS. 1 to 4, a rotatable chain 105 is arranged at the middle part of the mounting frame 102, and the magnetic rods 104 are separately arranged on both sides of the chain 105 in a cantilever shape and driven by the chain 105 to rotate. The baffle spring 1082 is arranged between the non-magnetic baffle 1081 and the chain 105, without affecting the rotation of the chain 105.

As shown in FIGS. 1 to 3, a chain actuator 106 is arranged on the mounting frame 102, a driving sprocket 101 is arranged at the middle part of the lower end of the mounting frame 102, and a driven sprocket 103 is arranged at the middle part of the upper end of the mounting frame 102. One end of the chain 105 bypasses the driving sprocket 101, and the other end of the chain 105 bypasses the driven sprocket 103. The driving sprocket 101 is driven by the chain actuator 106 to rotate, so as to drive the chain 105 to rotate. In this embodiment, the chain actuator 106 is a motor.

Figure 5:
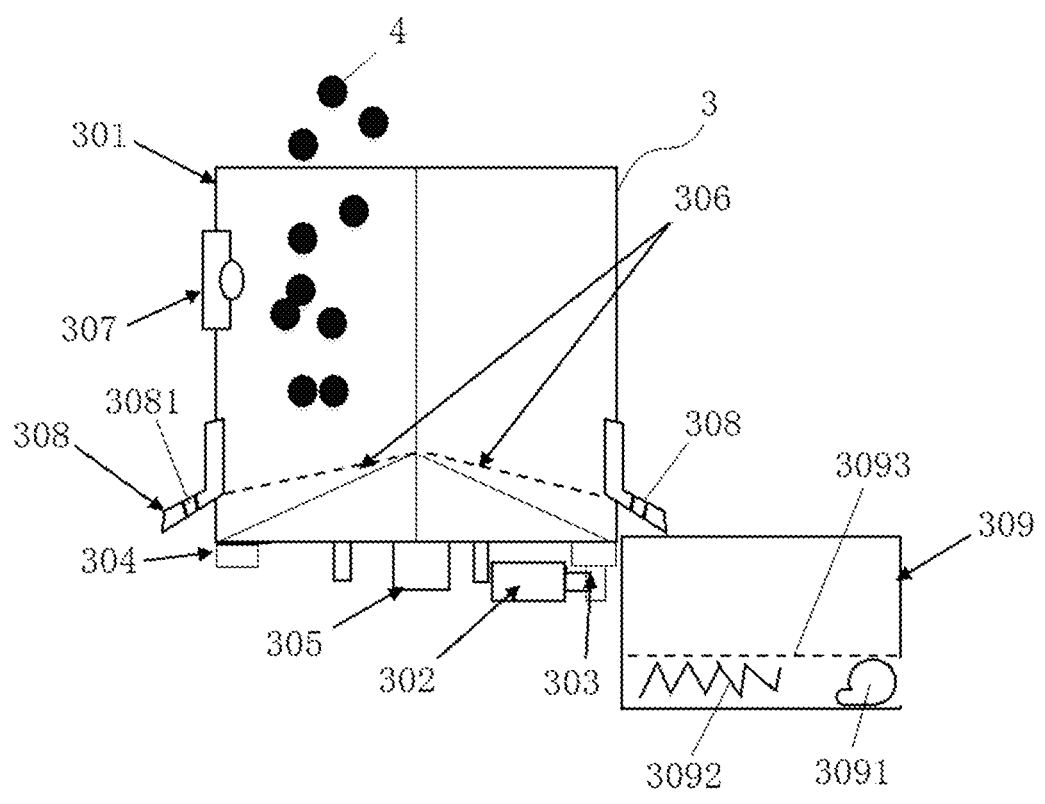
FIG. 5 is a structural schematic diagram of a magnetic particle recovery assembly in FIG. 1.

As shown in FIG. 5 to FIG. 11, the magnetic particle recovery assembly (3) includes a recovery box body (301), liquid pumps (311), a dry storage box (309), and a box body rotation mechanism. The recovery box body (301) is internally provided with multiple cavities, each cavity is provided with a liquid pump (311) and a magnetic particle recovery inductor (307), and a discharge port (308) is provided at the lower side of each cavity. The dry storage box (309) is arranged on one side of the recovery box body (301), the recovery box body (301) is driven by the box body rotation mechanism to enable the discharge port (308) of each cavity to align with an input end of the dry storage box (309). The discharge port (308) is provided with a discharge control valve (3081), and the liquid pump (311) is provided with a pipe a, a pipe b and a pipe c. As shown in FIG. 5, the pipe c extends into the next adjacent cavity sorted in a rotating direction. In addition, as shown in FIG. 3, a recovery hopper 312 with a rectangular opening is arranged above the recovery box body 301, and as shown in FIG. 3, the recovery hopper 312 is arranged below the ejection flare 1024, so as to ensure that when the non-magnetic baffles 1081 are completely ejected out, all the magnetic particles 4 on the magnetic rods 104 on both sides fall into the recovery hopper 312, and the recovery hopper 312 does not rotate with the recovery box body 301. When one cavity in the recovery box body 301 is rotated to a position below the mounting frame 102, a lower end of the recovery hopper 312 is narrowed to play a role in gathering, thus making the magnetic particles 4 fall into the cavity.

As shown in FIGS. 6 to 11, the present disclosure is explained by providing three cavities A, B and C in the recovery box body 301. At the beginning, the cavities A and B are filled with an eluent, while the cavity C has no eluent.

Figure 6:
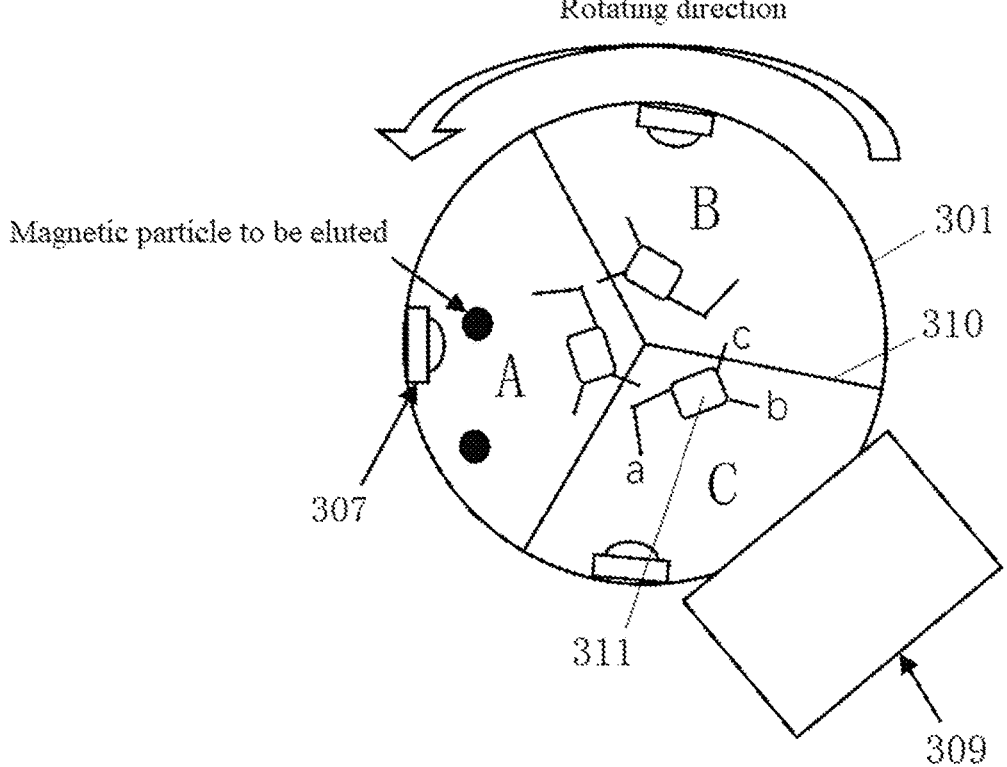
FIG. 6 is a first schematic diagram of a magnetic particle extraction mechanism in FIG. 5 in an operating state.
Figure 7:
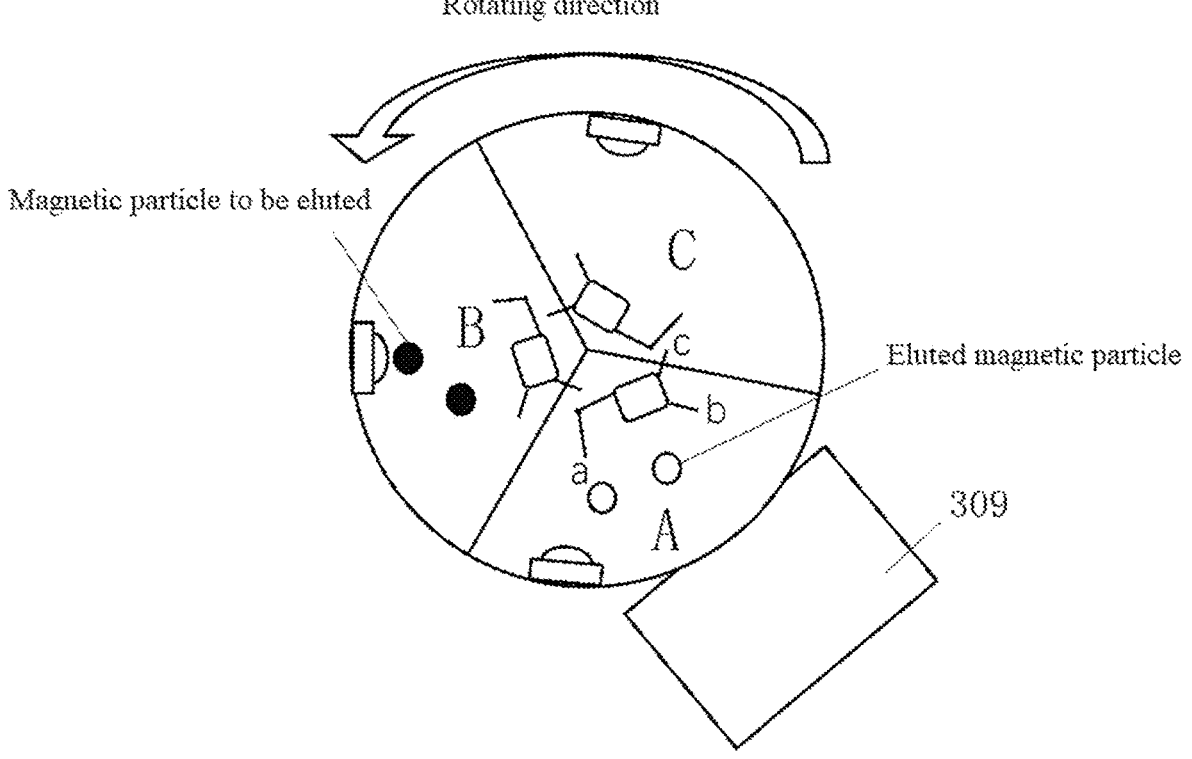
FIG. 7 is a second schematic diagram of a magnetic particle extraction mechanism in FIG. 5 in an operating state.
Figure 8:
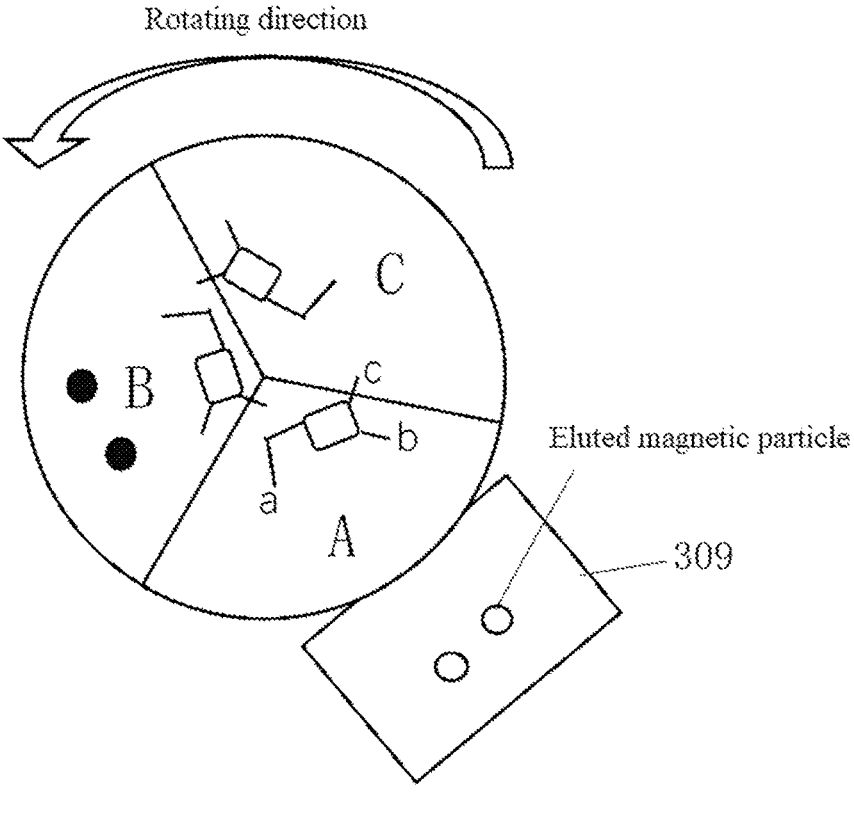
FIG. 8 is a third schematic diagram of a magnetic particle extraction mechanism in FIG. 5 in an operating state.

As shown in FIG. 6, when the cavity A is rotated to a position below the upper end of the mounting frame 102, the magnetic particles 4 are scraped off from the magnetic rod 104 under the action of the non-magnetic baffle 1081 and fall into the cavity A. When the magnetic particles 4 in the cavity A reach a set height, the magnetic particle recovery inductor 307 senses that the cavity A is full and transmits a signal to a control system. Under the control of the control system, the box body rotation mechanism is started to drive the recovery box body 301 to rotate, thus turning the cavity B to the position below the upper end of the mounting frame 102 to hold the falling magnetic particles 4. At the moment, as shown in FIG. 7, the discharge port 308 at the lower end of the cavity A is aligned with the dry storage box 309 for an elution operation. During elution, the discharge port 308 of the cavity A is in a closed state, an eluent enters through the pipe a of the liquid pump 311 in the cavity A and is discharged through the pipe b, and thus the eluent circularly flows to elute the recovered magnetic particles 4 for regeneration. After the regeneration is completed (that is, after the elute circularly flows for the set time), the pipe c of the liquid pump 311 is opened and the pipe b is closed, and the eluent in the cavity A is pumped into the cavity C through the pipe c. After the eluent completely flows out, the pipe c is closed and the discharge port 308 at the lower end of the cavity A is opened, as shown in FIG. 8, the eluted magnetic particles 4 in the cavity A are output into the dry storage box 309.

Figure 9:
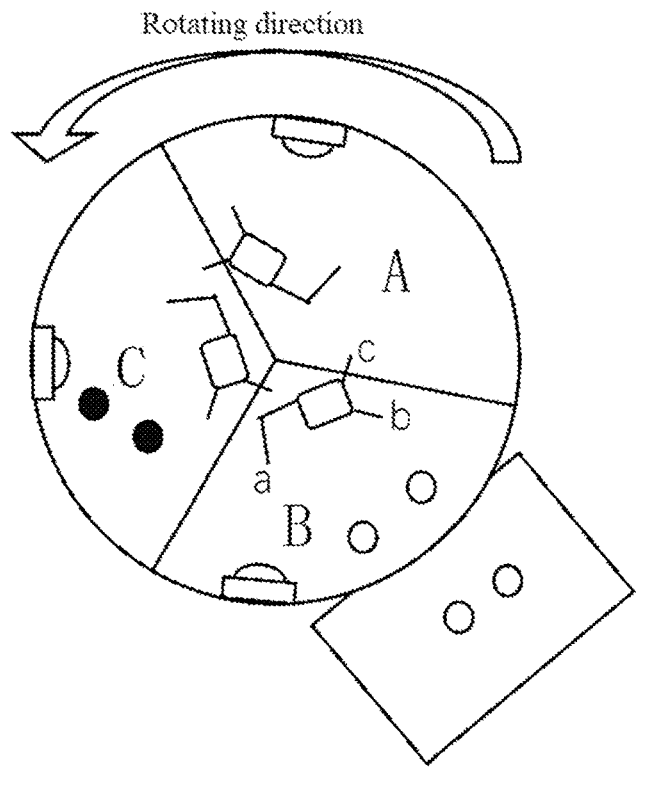
FIG. 9 is a fourth schematic diagram of a magnetic particle extraction mechanism in FIG. 5 in an operating state.
Figure 10:
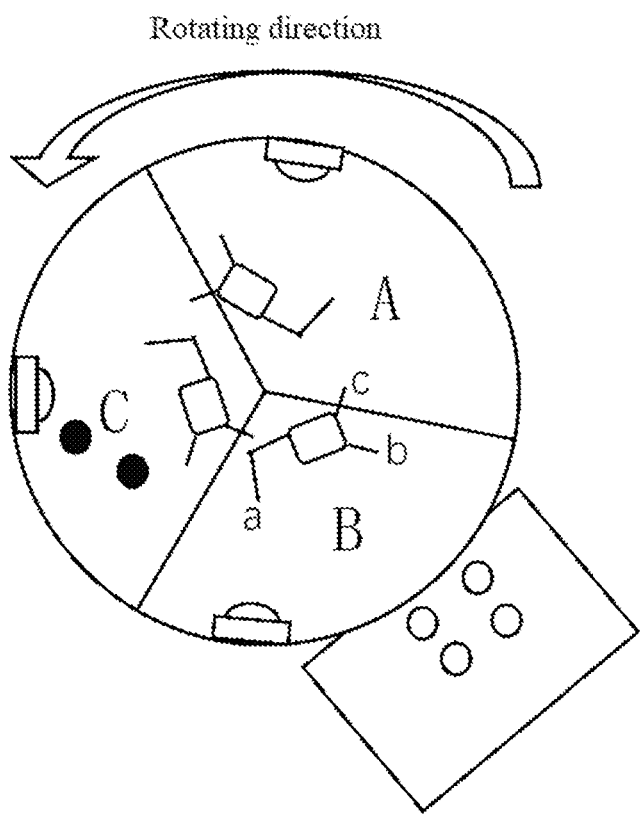
FIG. 10 is a fifth schematic diagram of a magnetic particle extraction mechanism in FIG. 5 in an operating state.

As shown in FIG. 9, when the cavity B is full, the recovery box body 301 is rotated to turn the cavity C to the position below the upper end of the mounting frame 102, the discharge port 308 at the lower end of the cavity B is aligned with the dry storage box 309 for the elution operation. Likewise, the eluent enters through the pipe a of the liquid pump 311 in the cavity B and then is discharged from the pipe b, and thus the eluent circularly flows to elute the recovered magnetic particles 4 for regeneration. After the regeneration is completed, the pipe c of the liquid pump 311 is opened and the pipe b is closed, and the eluent in the cavity B is pumped into the empty cavity A through the pipe c. After the eluent completely flows out, the pipe c is closed and the discharge port 308 at the lower end of the cavity B is opened, the eluted magnetic particles 4 in the cavity B are output into the dry storage box 309, and so on, thus achieving the cyclic elution, regeneration and output of the magnetic particles 4 in each cavity. Therefore, in addition to the realization of the real-time recovery, elution and dry storage of the magnetic particles 4, there is no need to additionally replenish the eluent for a long time as the eluent is recycled in different cavities, which satisfies the requirements for field use.

Figure 11:
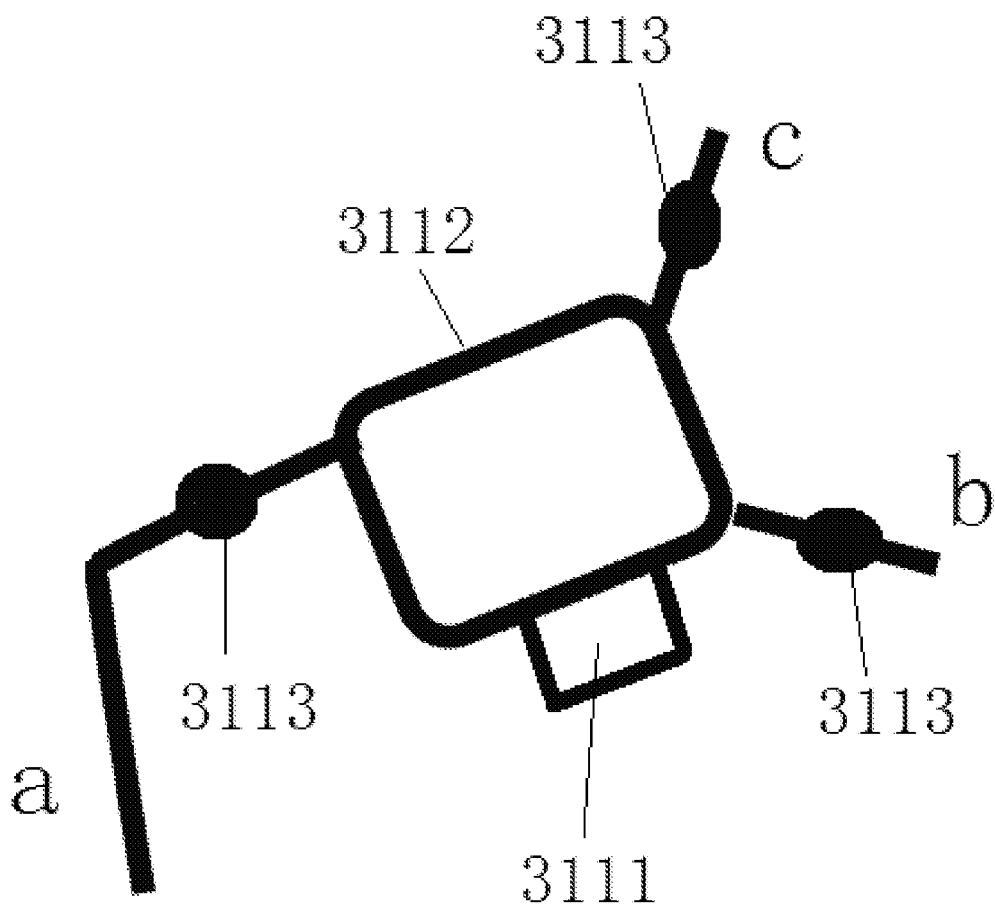
FIG. 11 is a structural schematic diagram of a liquid pump in FIG. 6.

As shown in FIG. 11, in this embodiment, an on-off control valve 3113 (a solenoid valve) is provided on each of the pipe a, the pipe b, and the pipe c of the liquid pump 311, so as to control the open/close of each pipe. In addition, an impeller is arranged inside a pump body 3112 in the liquid pump 311, and a driving motor 3111 is arranged outside the pump body 3112 to drive the impeller to rotate, so as to realize liquid pumping.

The magnetic particle recovery inductor 307, the discharge control valve 3081, and the on-off control valve 3113 are all well-known techniques in the art and are commercially available products.

As shown in FIG. 5, in this embodiment, the box body rotation mechanism includes a rotation actuator 302, a rotation driving gear 303, and a ring gear 304. A lower end of the recovery box body 301 is provided with a rotating shaft 305 which is rotationally mounted to the agricultural machinery frame body, and the ring gear 304 is arranged at the lower end of the recovery box body 301. The rotation actuator 302 is fixed to the agricultural machinery frame body and arranged at a lower side of the recovery box body 301, and an output shaft of the rotation actuator 302 is provided with a rotating driving gear 303 meshing with the ring gear 304. The rotation actuator 302 is used to the rotation driving gear 303 to rotate, and to drive the recovery box body 301 to rotate through the ring gear 304.

As shown in FIG. 5, the lower end of each cavity of the recovery box 301 is provided with an inclined filter screen 306, a mesh diameter of the filter screen 306 is smaller than a diameter of the magnetic particle 4. A port of the pipe a is arranged below the filter screen 306, and a port of the pipe b and a port of the pipe c are arranged above the filter screen 306, such that when the eluent is input from the pipe a for cyclic flow, the magnetic particles 4 are blocked by the filter screen 306 and cannot enter the pipe a, only the eluent enters the pipe a. As the filter screen 306 is inclined, after the discharge control valve 3081 is opened, the eluted magnetic particles 4 in the cavity roll down along the inclined filter screen 306 and fall into the dry storage box 309. In addition, the liquid pump 311 and the magnetic particle recovery inductor 307 can be mounted to appropriate positions of the corresponding cavity according to actual needs.

As shown in FIG. 5, in this embodiment, the dry storage box 309 is internally provided with a dry filter screen 3093, a fan 3091, and electric heating wires 3092. The fan 3091 and the electric heating wires 3092 are arranged at a lower side of the dry filter screen 3093. One side of a lower end of the dry storage box 309 is provided with an opening, and the fan 3091 is arranged at the opening to introduce outside air. After the air is introduced, the air is heated by the electric heating wires 3092 and flows upwards to dry the eluted magnetic particles 4 through the dry filter screen 3093. The electric heating wires 3092 can be powered by a storage battery arranged on the agricultural machinery frame body or directly powered by a battery of agricultural machinery equipment.

As shown in FIG. 1, the agricultural machinery frame body includes a front frame body 2 and a rear frame body 107. A front end of the front frame body 2 is provided with a front wheel 201, a rear end of the rear frame body 107 is provided with a rear wheel 1071, a front end of the rear frame body 107 is connected to a rear end of the front frame body 2 by connecting bolts 1072 or other connecting elements. The magnetic particle extraction mechanism 1 and the magnetic particle recovery assembly 3 are arranged on the rear frame body 107, and a magnetic particle spreading means 6 and a rotary tiller 7 are provided on the front frame body 2. The magnetic particle spreading means 6 is used for releasing magnetic the particles 4 into the soil, and includes a magnetic particle mixing box. The magnetic particle mixing box is internally provided with a stirring device, and a magnetic particle spreading outlet 601 is provided on one side of the magnetic particle mixing box. During use, the magnetic particles 4 and a soil solution are mixed and stirred by the stirring device in the magnetic particle spreading means 6, and then are released through the magnetic particle spreading outlet 601 in a unified manner. The stirring device may employ a motor-driven stirring impeller and other structures, which is a well-known technique in the art. In addition, in this embodiment, the rotary tiller 7 is a motor-driven rotary blade, which is also a well-known technique in the art. The magnetic particles 4 can be placed in a deeper soil layer when the magnetic particles 4 are released by the rotary tiller 7, and the magnetic particles 4 can be turned out to facilitate the magnetic adsorption when the magnetic particles 4 are recovered.

According to the actual need, the front frame body 2 and the rear frame body 107 can be split for use, or combined for use. When the front frame body 2 and the rear frame body are split for use, the front frame body 2 is connected to corresponding agricultural machinery (such as a tractor, etc.) when the magnetic particles 4 need to be released, and the rear frame body 107 is connected to the corresponding agricultural machinery when the magnetic particles 4 need to be recovered. When the front frame body 2 and the rear frame body 107 are combined for use, during the release of the magnetic particles 4, the lifting regulator 8 drives the mounting frame 102 to rotate, so as to ascend the lower end of the mounting frame 102 to a set height from the soil surface, and at the moment, it is mainly the devices on the front frame body 2 that operate. During the recovery of the magnetic particles 4, the lifting regulator 8 drives the mounting frame 102 to rotate to immerse the lower end of the mounting frame 102 in the muddy water of the flooded soil to absorb the magnetic particles 4, and the magnetic particles 4 in the soil are first turned out by the rotary tiller 7 to facilitate the subsequent adsorption.

As shown in FIGS. 1 to 2, in this embodiment, a control system 5 is provided on the front frame body 2, and devices such as the lifting regulator 8, the chain actuator 106, a motor of the rotary tiller 7, the control valves of the respective pipelines in the magnetic particle recovery assembly 3, and the box body rotation actuator 302 are controlled by the control system 5. The control system 5 is a well-known technique in the art.

The operating principle of the device is as follows:

During operation, the magnetic rods 104 are used for adsorbing the magnetic particles 4 (i.e., remediation microspheres for adsorbing heavy metals) in the muddy water of the flooded soil, and an amplitude of the lower end of the mounting frame 102 immersed in the soil muddy water can be driven and adjusted by the lifting regulator 8. Afterwards, the magnetic rods 104 circumferentially move along the closed loop of the mounting frame 102, and drive the adsorbed magnetic particles 4 to move upwards along an upper side of the mounting frame 102. Meanwhile, the retractable baffle assembly 108 on the magnetic rods 104 moves along the turn-over channel 1021 in the middle part of the mounting frame 102 with the magnetic rods 104. During the ascending of the magnetic particles 4, the moisture on the magnetic particles 4 and impurities that are not adsorbed on the magnetic particles 4 can be automatically scraped off and removed under the action of gravity, such that it is unnecessary to additionally provide structures such as a variable diameter stirrer and a filter screen for filtering, the structure is greatly simplified and the energy consumption is reduced. The magnetic rods 104 enters the compression flaps 1023 area after bypassing the upper end of the mounting frame 102, the non-magnetic baffles 1081 are completely ejected out of the ejection flare 1024 under the action of the baffle springs 1082, and the magnetic particles 4 adsorbed on the magnetic rods 104 are scraped off to the magnetic particle recovery assembly 3. After ejection, the non-magnetic baffles 1081 abut against the compression flaps 1023 on the corresponding side. With the movement of the magnetic rods 104, the non-magnetic baffles 1081 are compressed by the compression flaps 1023 to retreat till to re-enter the turn-over channel 1021. Then, the magnetic rods 104 are rotated to the lower end of the mounting frame 102 to re-adsorb the magnetic particles 4, thus achieving continuous operation. The recovery efficiency is improved while the requirements of continuous operation in the farmland are achieved. Moreover, the release of the magnetic particles 4 is achieved through the cooperation of the baffle springs 1082 and the compression flaps 1023, the structure is simple, and the performance is reliable.

As shown in FIGS. 5 to 11, the magnetic particles 4 fall into the cavity A after entering the magnetic particle recovery assembly 3, after the cavity A is full, under the control of the control system, the box body rotation mechanism is started to drive the recovery box body 301 to rotate, thus rotating the next cavity B to the position below the mounting frame 102 to hold the falling magnetic particles 4. Meanwhile, the discharge port 308 at the lower end of the cavity A is aligned with the dry storage box 309 for elution operation. During elution, the discharge port 308 of the cavity A is in a closed state, the eluent enters through the pipe a of the liquid pump 311 in the cavity A and is discharged from a pipe b, and thus the eluent circularly flows to elute the recovered magnetic particles 4 for regeneration. After completing the elution and regeneration, the pipe c of the liquid pump 311 in the cavity A is opened, and the pipe b is closed, the eluent in the cavity A is pumped into the next adjacent cavity in a rotating direction through the pipe c. After the eluent completely flows out, the pipe c is closed, and the discharge port 308 at the lower end of the cavity A is opened to output the magnetic particles 4 to the dry storage box 309. The above process is repeated when the cavity B is full, and so on, thus achieving the cyclic elution, regeneration and output of the magnetic particles 4 in each cavity.

What is claimed is:

1. A vehicle-mounted in-situ magnetic field decontamination device for heavy metal contaminated soil with a retractable baffle, comprising a magnetic particle extraction mechanism, a magnetic particle recovery assembly, a lifting regulator, and an agricultural machinery frame body, wherein the magnetic particle extraction mechanism comprises a mounting frame, a plurality of magnetic rods, and a retractable baffle assembly; the mounting frame is in a shape of a closed loop, and the plurality of magnetic rods move circumferentially along the closed loop of the mounting frame and are configured to adsorb magnetic particles in the heavy metal contaminated soil in a slurry state, the magnetic particles are configured to adsorb heavy metals in the heavy metal contaminated soil, a lower end of the mounting frame and a lower end of the lifting regulator are hinged with the agricultural machinery frame body, and an upper end of the mounting frame is supported by the lifting regulator; the magnetic particle recovery assembly is arranged on the agricultural machinery frame body and below the upper end of the mounting frame; the retractable baffle assembly comprises baffle springs and non-magnetic baffles arranged at free ends of the baffle springs, and the non-magnetic baffles and the baffle springs each sleeve a corresponding one of the magnetic rods; the mounting frame is provided at a middle part thereof with a turn-over channel for the retractable baffle assembly to move, the turn-over channel are provided at both sides thereof with compression flaps, and the compression flaps are arranged at a lower side of the upper end of the mounting frame; an ejection flare configured to allow the ejection of the non-magnetic baffles is formed between tilted free ends of the compression flaps on both sides, the non-magnetic baffles abut against respective compression flaps after fully extending out, and are compressed to retreat by the compression flaps along with movement of the magnetic rods.

2. The vehicle-mounted in-situ magnetic field decontamination device for heavy metal contaminated soil with a retractable baffle according to claim 1, wherein two limit flaps are arranged at the middle part of the mounting frame, and the turn-over channel is formed between the two limit flaps; the non-magnetic baffles are provided with baffle sliding shafts, and after the non-magnetic baffles enter the ejection flare and are ejected out, the baffle sliding shafts abut against the corresponding compression flaps; and when the non-magnetic baffles enter the turn-over channel, the baffle sliding shafts abut against corresponding limit flaps.

3. The vehicle-mounted in-situ magnetic field decontamination device for heavy metal contaminated soil with a retractable baffle according to claim 1, wherein a rotatable chain is arranged at the middle part of the mounting frame, and the magnetic rods are arranged separately on both sides of the chain in a cantilever shape.

4. The vehicle-mounted in-situ magnetic field decontamination device for heavy metal contaminated soil with a retractable baffle according to claim 3, wherein a chain actuator is provided on the mounting frame, a driving sprocket is arranged at a middle part of the lower end of the mounting frame, a driven sprocket is arranged at a middle part of the upper end of the mounting frame; one end of the chain bypasses the driving sprocket, and an other end of the chain bypasses the driven sprocket; and the driving sprocket is configured to be driven by the chain actuator to rotate.

5. The vehicle-mounted in-situ magnetic field decontamination device for heavy metal contaminated soil with a retractable baffle according to claim 1, wherein the magnetic particle recovery assembly comprises a recovery box body, liquid pumps, a dry storage box, and a box body rotation mechanism, wherein the recovery box body is provided with a plurality of cavities, each cavity of the plurality of cavities is provided with one of the liquid pumps and a magnetic particle recovery inductor, the cavity is provided at a lower side thereof with a discharge port, the dry storage box is arranged at one side of the recovery box body, and the recovery box body is configured to be driven by the box body rotation mechanism to enable the discharge port of the cavity to align with an input end of the dry storage box; the discharge port is provided with a discharge control valve, each liquid pump of the liquid pumps is provided with a pipe a, a pipe b and a pipe c, and the pipe c extends into a next adjacent cavity in a rotating direction.

6. The vehicle-mounted in-situ magnetic field decontamination device for heavy metal contaminated soil with a retractable baffle according to claim 4, wherein the box body rotation mechanism comprises a rotation actuator, a rotation driving gear, and a ring gear; a lower end of the recovery box body is rotationally mounted to the agricultural machinery frame body, the ring gear is arranged at the lower end of the recovery box body, the rotation actuator is fixed to the agricultural machinery frame body and arranged at a lower side of the recovery box body, and the rotation actuator is provided on an output shaft thereof with a rotation driving gear meshing with the ring gear.

7. The vehicle-mounted in-situ magnetic field decontamination device for heavy metal contaminated soil with a retractable baffle according to claim 4, wherein a dry filter screen, a fan and electric heating wires are provided in the dry storage box; the fan and the electric heating wires are arranged at a lower side of the dry filter screen, an opening is formed at one side of a lower end of the dry storage box, and the fan is arranged at the opening; an inclined filter screen is provided at a lower end of each cavity of the recovery box body, and a mesh diameter of the inclined filter screen is smaller than diameter of the magnetic particles; a port of the pipe a of the liquid pump is arranged below the filter screen, and a port of the pipe b and a port of the pipe c are arranged above the filter screen.

8. The vehicle-mounted in-situ magnetic field decontamination device for heavy metal contaminated soil with a retractable baffle according to claim 4, wherein after entering the magnetic particle recovery assembly, the magnetic particles fall into a cavity A filled with an eluent; after the cavity A is filled, the recovery box body is rotated to turn a cavity B filled with the eluent to a position below the mounting frame to hold the magnetic particles; meanwhile, the discharge port at a lower end of the cavity A is aligned with the dry storage box for an elution operation; during elution, the discharge port of the cavity A is closed, the eluent enters from the pipe a of the liquid pump in the cavity A and is discharged through the pipe b; after completing the elution and regeneration, the pipe c of the liquid pump in the cavity A is opened, and the pipe b is closed, the eluent in the cavity A is pumped into a next cavity which is adjacent to the cavity A in a rotating direction and has no eluent through the pipe c; and after the eluent completely flows out, the pipe c is closed, and the discharge port at the lower end of the cavity A is opened to output the magnetic particles.

9. The vehicle-mounted in-situ magnetic field decontamination device for heavy metal contaminated soil with a retractable baffle according to claim 1, wherein the agricultural machinery frame body comprises a front frame body and a rear frame body, a magnetic particle spreading means and a rotary tiller are provided on the front frame body, and the magnetic particle extraction mechanism and the magnetic particle recovery assembly are arranged on the rear frame body.

10. The vehicle-mounted in-situ magnetic field decontamination device for heavy metal contaminated soil with a retractable baffle according to claim 9, wherein the front frame body is provided at a front end thereof with a front wheel, a rear end of the front frame body is detachably connected to a front end of the rear frame body, the rear frame body is provided at a rear end thereof with a rear wheel, and a control system is provided on the front frame body.

* * * * *